Patented June 14, 1949

2,473,260

UNITED STATES PATENT OFFICE 2,473,260

PREPARATION OF TETRAMETHYL SILICATE

Eugene G. Rochow, Schenectady, N. Y., assignor to General Electric Company, a corporation of New York No Drawing. Application June 26, 1946, Serial No. 679,562

10 Claims. (Cl. 260—448.8)

This invention relates to the preparation of organic derivatives of silicon. More particularly, the invention is concerned with new methods for the production of tetramethyl silicate.

The present invention is based on my discovery that tetramethyl silicate may be prepared in good yields by effecting reaction between methyl alcohol and silicon in the presence of a catalyst for the reaction selected from the class consisting of copper and compounds (e. g., salts) of copper capable of being reduced under the conditions of the reaction, e. g., by the silicon or methyl alcohol, or capable of being decomposed, e. g., by the elevated temperatures employed, to the free copper state. For brevity the combined class of copper, copper compounds decomposable to copper under the conditions of the reaction or the silicon-reducible or methanol-reducible copper compounds will be referred to herein as the "catalyst."

One of the present-day methods for producing tetraalkyl silicates, especially tetraethyl silicate, comprises effecting reaction between an alkyl alcohol and a tetrahalogenosilane. For instance, tetraethyl silicate is prepared by causing ethyl alcohol to react with silicon tetrachloride. This type of reaction has several disadvantages, among these being that one of the products of the reaction is hydrogen chloride which is ordinarily quite corrosive on the machinery and reaction chambers usually employed in this reaction. In addition, this type of reaction requires the use of a tetrahalogenosilane, which has in it only a minor proportion of silicon and which is normally quite expensive, thus rendering the cost of the obtained product quite high. Moreover, tetrahalogenosilanes themselves are readily hydrolyzable to produce a hydrogen halide which is corrosive to equipment. This makes the tetrahalogenosilane difficult to store and handle.

I have now discovered that tetraalkyl silicates, specifically tetramethyl silicate, can be obtained in good yield and without any corrosive by-products. Briefly described, my invention resides in the improved method of preparing tetramethyl silicate which comprises effecting reaction between silicon and methanol in the presence of copper or a copper compound decomposable to copper, or in the presence of an organic or inorganic copper compound (e. g., an organic or inorganic copper salt) which is capable of being reduced, e. g., by the silicon or by the methyl alcohol, to the free copper state under the conditions of the reaction. In a preferred embodiment of the invention, reaction is effected between methanol and silicon while the former is in the vapor state, and while the said components are intimately associated with a catalyst for the reaction, more specifically, copper. For instance, where practical, the silicon may be in the form of an alloy thereof with copper or with a silicon-reducible, or with a methanol-reducible copper salt, or else the silicon may be intimately mixed in the form of a powder with either the copper powder or a powder prepared from the silicon-reducible, methanol-reducible or copper-decomposable copper compound.

Among the catalysts which may be employed in my invention, there may be mentioned, e. g., copper oxide, both the cuprous and the cupric forms, copper halides, for example, cuprous chloride, cuprous bromide, cupric chloride, cupric bromide, etc., copper nitrate, copper salts of lower aliphatic acids, for instance, cupric acetate, cupric formate, etc., copper carbonates, copper hydroxide, copper cyanide, etc. I prefer to use metallic copper as the catalyst for the reaction between the silicon and the methanol.

Various methods may be employed to effect the reaction between the silicon and the methanol in the presence of the above-disclosed catalysts. One method comprises intimately mixing silicon powder and copper powder, and thereafter firing the mixture of powders at elevated temperatures, for example, 1000° C., in a reducing atmosphere, for instance hydrogen. The fired powder may then be ground into the form of small particles, packed into a reaction tube and heated at temperatures of the order of 150–450° C., preferably between 200–325° C. Substantially anhydrous or regular commercial methanol is passed through the reaction tube over the powdered silicon-catalyst mixture, and the effluent vapors from the reaction are condensed. The tetramethyl silicate may be isolated from the condensate by the usual methods known to those skilled in the art, for example, by fractional distillation. The condensate, in addition to containing good yields of tetramethyl silicate, also contains small amounts of methyl silanes in which both hydrogen atoms and methyl groups are attached directly to the silicon atom, as well as small amounts of the silanes composed solely of silicon and hydrogen.

In order that those skilled in the art may better understand how the present invention may be practiced, the following examples are given by way of illustration and not by way of limitation. All parts are by weight.

Example 1

About 10 parts powdered copper and 90 parts powdered silicon were intimately mixed together, molded into the form of small pellets and fired in a hydrogen atmosphere at about 1050° C. for about two hours. These pellets were then packed into a glass tube of approximately 1″ diameter and the tube was heated at a substantially average temperature of about 300° C. About 80 parts anhydrous methanol was allowed to drip, by means of a dropping funnel, into the heated reaction tube over a period of approximately 5½ hours. The effluent gases issuing at the exit end of the tube were collected in a series of traps arranged in the order of decreasing temperatures of condensation. The order of these traps was, respectively, water condensation trap (about 15° C.), carbon dioxide trap (about −80° C.) and a liquid nitrogen trap (about −196° C.). At the end of this time there was present in the 15° C. trap about 59 parts of condensate, in the −80° C. trap about 10 parts condensate, and in the −196° C. trap about 4.4 parts condensate. The condensate in the liquid nitrogen trap comprised mainly methane while the condensate in the $CO_2$ trap contained substantial amounts of tetramethyl silicate. The product obtained in the water trap was fractionally distilled to yield a material identified as tetramethyl silicate (boiling point about 120–121° C.) in a yield of about 40.2 per cent based on weight of methyl alcohol employed in the reaction.

Example 2

In this example a charge of copper and silicon similar to the one employed in Example 1 was placed in a reaction tube of the type disclosed in Example 1. The temperature throughout the reaction was maintained substantially around 250° C. while about 80 parts methyl alcohol was passed over the copper-silicon mixture for a period of about 3½ hours. The gases issuing at the exit end of the tube were condensed in a series of traps similar to the ones employed in Example 1. In this case, the condensate obtained in the water trap consisted of an amount of tetramethyl silicate equivalent to a yield of approximately 44 per cent based on the weight of methyl alcohol employed in the reaction.

Example 3

About 131 parts copper powder and 1184 parts silicon powder were intimately mixed together and the mixture of powders was heated in a hydrogen atmosphere at about 1000° C. for approximately one hour. The sintered mass thus obtained was crushed into a fairly uniform powder and packed into an iron reaction tube about 1 inch in diameter and approximately 8 feet long. The reaction tube was heated by means of hot tricresyl phosphate circulated in a jacket surrounding the said iron tube. Throughout the reaction, the temperature of the tricresyl phosphate was maintained fairly constantly at about 225° C. by means of a control apparatus on the tricresyl phosphate heater. Substantially anhydrous methyl alcohol was passed through the reaction tube at the rate of about 24 parts per hour until approximately 745 parts of the alcohol had been used. Approximately 477 parts of a condensate was obtained in a water trap (15° C.) placed at the exit end of the reaction tube to condense the effluent vapors. This condensate was fractionally distilled to yield about 357 parts of tetramethyl silicate boiling at about 120–122° C. This represented a yield of about 75 per cent based on the weight of the condensate distilled and a yield of approximately 49 per cent based on the weight of methyl alcohol employed in the reaction.

Example 4

When methyl alcohol was passed over a heated, crushed copper-silicon alloy comprising equal proportions, by weight, of silicon and copper, the yield of tetramethyl silicate based on the weight of methyl alcohol employed in the reaction was about 15 per cent. Throughout this reaction the temperature was maintained at about 300–320° C. for about 1¾ hours.

Example 5

Tetramethyl silicate was also obtained by passing methyl alcohol over a mixture of powders comprising, by weight, about 10 per cent cuprous oxide ($Cu_2O$) and about 90 per cent silicon powder while the temperature of the reaction tube was maintained at about 275–315° C. for about 1¾ hours.

It will be understood, of course, by those skilled in the art that my invention is not limited to the use of copper or to the use of the specific copper-containing catalysts disclosed in the foregoing examples. Other copper compounds, both inorganic and organic, examples of which have been given hereinbefore, may also be employed to effect reaction between the silicon and the methyl alcohol. Other catalysts, e. g., aluminum, silver, aluminum oxide, etc., were found to be ineffective in obtaining tetramethyl silicate from the reaction of silicon and methyl alcohol.

Although tetramethyl silicate may be obtained by passing methyl alcohol over silicon alone, the yields obtained are so meager that use of this reaction without the copper or suitable copper compound as a catalyst is not practical. Tetraethyl silicate may be produced by substituting ethyl alcohol for the methyl alcohol in my method of preparation. However, the yield of tetraethyl silicate is lower than, and does not compare with, the yields obtained when methyl alcohol is employed in the reaction.

In general, in practicing my invention, the vapor-phase reactions are preferred because they can be carried out more economically, may be controlled more easily and may be directed toward the production of tetramethyl silicate with a minimum of by-products.

It will also be understood that my invention is not limited to the specific temperatures or temperature ranges mentioned in the above examples. However, the reaction temperature should not be so high as to cause conversion or decomposition of the methanol to dimethyl ether or other products. In general, the reaction temperature to be used will vary with, for example, the rate at which the methanol is fed into the reaction chamber, the particular catalyst used, type of reactor employed, etc. As stated previously, temperatures of the order of 150–450° C. may be effectively employed. However, optimum results are usually obtained at temperatures of the order of about 200–325° C.

It will be apparent to those skilled in the art that the proportion of catalyst present in the mixture with the silicon may be varied over wide ranges. Thus, by weight, I may use, e. g., from about 2 per cent to as high as 50 per cent catalyst based on the total weight of the silicon and the catalyst. I prefer that about from 75 per cent to 95 per cent of the mixture of silicon and catalyst consist substantially of silicon.

The products of this invention have utility as intermediates in the prepartion of other products, e. g., in the manufacture of methyl or ethyl methoxysilanes. They may also be used in most applications where tetraethyl silicate finds use, e. g., as a preservative for stone, as a source of pure silica for phosphorescent powders, as a delustrant, etc. In addition, tetramethyl silicate finds utility as an incorporant for increasing the wet strength of paper.

What I claim as new and desire to secure by Letters Patent of the United States is:

1. The method of preparing tetramethyl silicate which comprises heating a mixture comprising silicon and methyl alcohol in the presence of a compound selected from the class consisting of copper, oxides of copper, hydroxides of copper, copper halides, copper salts of aliphatic acids, copper carbonates, copper hydroxide, copper cyanide, and mixtures thereof.

2. The method of preparing tetramethyl silicate which comprises heating a mixture comprising silicon and methyl alcohol while the said components are intimately associated with copper.

3. The method of preparing tetramethyl silicate which comprises heating a mixture comprising methyl alcohol and silicon in the form of an alloy thereof with copper.

4. The method of preparing tetramethyl silicate which comprises effecting reaction between methyl alcohol and silicon while the said components are intimately associated with a copper halide.

5. The method of preparing tetramethyl silicate which comprises heating a mixture comprising silicon and methyl alcohol while the said components are intimately associated with a copper oxide.

6. The method of preparing tetramethyl silicate which comprises bringing gaseous methyl alcohol into contact with a mass of silicon intimately associated with copper, heating the said methyl alcohol and silicon-copper mass at a temperature of from about 150° to 450° C., and recovering the tetramethyl silicate.

7. The method of preparing tetramethyl silicate which comprises bringing gaseous methyl alcohol into contact with a mass of silicon intimately associated with a copper halide, heating the said methyl alcohol and mass of silicon-copper compound at a temperature of from about 150° to 450° C., and recovering the tetramethyl silicate.

8. The method of preparing tetramethyl silicate which comprises bringing gaseous methyl alcohol into contact with a mass of silicon intimately associated with an oxide of copper, heating the said methyl alcohol and mass of silicon-copper compound at a temperature of from about 150° to 450° C., and recovering the tetramethyl silicate.

9. The method which comprises heating a mixture comprising methyl alcohol and silicon while the said components are intimately associated with cuprous oxide.

10. The method which comprises causing gaseous methyl alcohol to react with silicon intimately associated with copper, said reaction being carried out within a temperature range of 150–450° C., and cooling the effluent vapors to obtain a condensate comprising tetramethyl silicate.

EUGENE G. ROCHOW.

REFERENCES CITED

The following references are of record in the file of this patent:

UNITED STATES PATENTS

| Number | Name | Date |
| --- | --- | --- |
| 2,389,931 | Reed et al. | Nov. 27, 1945 |

OTHER REFERENCES

Hurd et al., Jour. Amer. Chem. Soc., vol. 67, p. 1057–1059 (1945).